Sept. 27, 1938.                G. CAMPBELL                 2,131,612
                                LAWN BROOM
                             Filed May 27, 1937
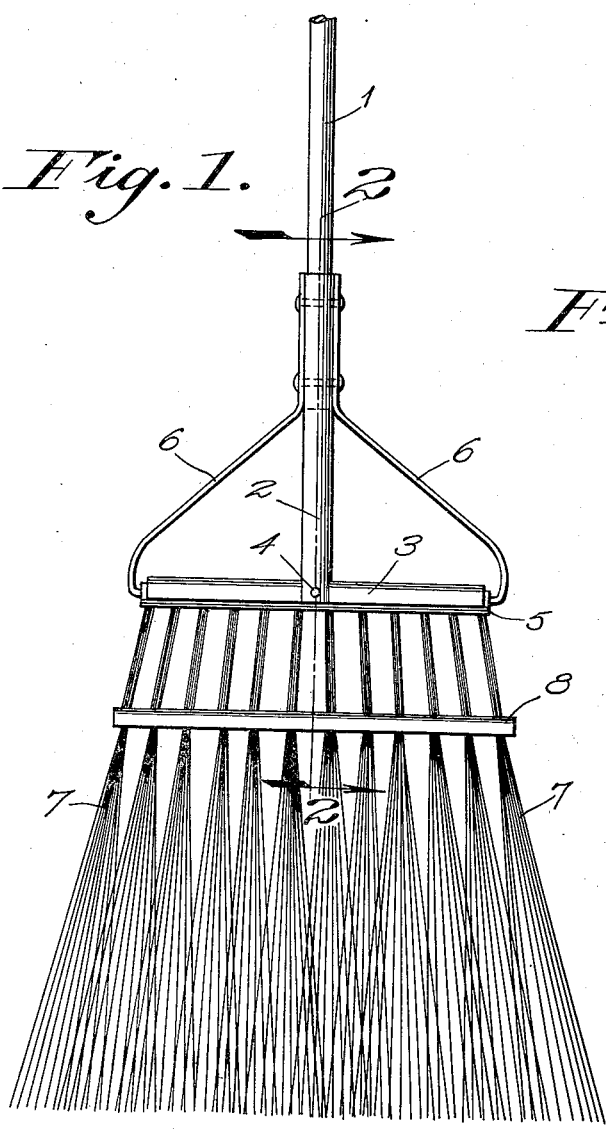
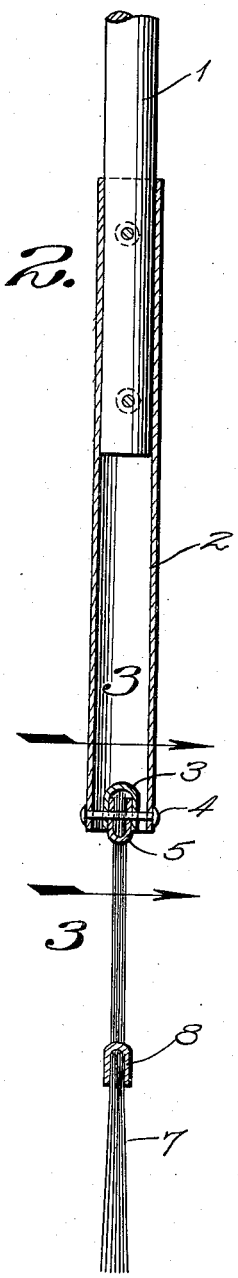
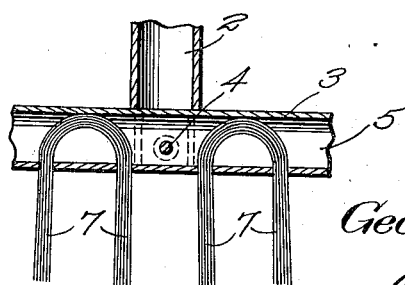
George Campbell
INVENTOR
BY Victor J. Evans & Co.
ATTORNEYS Patented Sept. 27, 1938

2,131,612

UNITED STATES PATENT OFFICE 2,131,612

LAWN BROOM

George Campbell, Prescott, Ark., assignor of fifty-one percent to Jewel White, Prescott, Ark.

Application May 27, 1937, Serial No. 145,135

2 Claims. (Cl. 15—198)

This invention relates to brooms, and its general object is to provide a broom that is primarily designed for use on lawns and the like, in that it is capable of removing cut grass, trash, etc., therefrom, in an easy, expeditious and thorough manner, with minimum effort on the part of the user.

An important object is to provide a lawn broom that includes a metallic head and bristles which are made from strands of relatively stiff resilient wire held together in tuft formation within the head and against casual removal or displacement, with the result the broom is capable of long wear and subject to much abuse without damage or breakage.

Another object is to provide a lawn broom, that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a front view of the broom which forms the subject matter of the present invention.

Figure 2 is a sectional view taken approximately on line 2—2 of Figure 1, looking in the direction of the arrows.

Figure 3 is a sectional view taken approximately on line 3—3 of Figure 2, looking in the direction of the arrows.

Referring to the drawing in detail, the reference numeral 1 indicates the handle of my broom which is of the usual length and preferably made from wood and secured to the lower end of the handle is a sleeve or ferrule 2 that extends below the handle and the lower end thereof is provided with diametrically opposed notches, as best shown in Figure 3.

Mounted in the notches for fitting association therewith is a head bar 3 of inverted U-form in cross section, and secured accordingly by a bolt 4 which likewise extends through a bar 5 that is also U-form in cross section and fits within the bar 3, as shown in Figure 2.

Secured to the ferrule 2 by rivets or the like, are the parallel upper ends of arms 6 which extend from the parallel portions in downwardly diverging relation with respect thereto and have their lower ends inwardly directed and formed with or otherwise secured to the outer ends of the bar 5, to act as brace means for the head of the broom as will be apparent.

The bar 5 may be termed the bristle receiving bar in that it is provided with spaced openings in the lower or bight portion thereof, for the purpose of receiving groups 7 of strands of relatively stiff resilient wire which are looped upon themselves to provide parallel portions that extend through the openings as clearly shown in Figure 3, and held accordingly by the clamping association of the bars 3 and 5 with respect to each other.

A spacer bar 8 is provided for the groups of bristles, and has openings therein for the passage of the parallel portions therethrough, the spacer bar being also of U-form as shown in Figure 2, with the side walls thereof disposed in clamping association with the bristles. The spacer bar is disposed a considerable distance below the bars 3 and 5 and the bristles depend from the spacer bar in outwardly flared tuft formation as clearly shown in Figure 1.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A broom comprising a handle, a bar of inverted U-form in cross section, a bar of U-form in cross section fitting within the first bar and having openings along the length thereof, a ferrule secured to the handle and having the bars secured thereto, brace means for the bars and disposed between the latter and the ferrule, bristles formed from strands of relatively stiff resilient wire arranged in groups extending through the openings and looped upon themselves, with the looped portions clamped between the bars, and a spacer bar for the bristles with the latter depending therefrom in outwardly flared tuft formation.

2. A broom comprising a handle, a ferrule secured to the lower end thereof and extending therefrom, said ferrule having a notched outer end, a bar of inverted U-form in cross section, a bar of U-form in cross section fitting within the first bar and having openings along the length thereof, arms secured to the ferrule and extending therefrom in diverging relation with their outer ends fixed to the second bar for bracing said bars, bristles formed from strands of relatively stiff resilient wire arranged in groups extending through the openings and looped upon themselves with the loop portions clamped between the bars, and a spacer bar having openings therein for the passage of the groups of the bristles therethrough, and said bristles depending from the spacer bar in outwardly flared tuft formation.

GEORGE CAMPBELL.